UNITED STATES PATENT OFFICE.

JOHN T. H. DEMPSTER, OF SCHENECTADY, NEW YORK, ASSIGNOR TO GENERAL ELECTRIC COMPANY, A CORPORATION OF NEW YORK.

SILICON ALLOY.

No. 923,152.      Specification of Letters Patent.      Patented June 1, 1909.

Application filed October 26, 1908. Serial No. 459,553.

*To all whom it may concern:*

Be it known that I, JOHN T. H. DEMPSTER, a citizen of the United States, residing at Schenectady, county of Schenectady, State of New York, have invented certain new and useful Improvements in Silicon Alloys, of which the following is a specification.

My invention comprises what I may term an alloy of silicon and tellurium. This alloy may be used for a variety of purposes but is especially adapted for use as a resistance material in connection with lightning arrester resistances, heating units, and so forth. Such an alloy of silicon and tellurium possesses a higher specific resistance than commercial silicon now in use as resistance material.

The tellurium can be alloyed with the silicon in a variety of proportions, according to the properties desired in the alloy. Alloys useful as resistance material, in general, may contain from one to fifteen per cent. of tellurium. I prefer to add about five per cent. of tellurium in making the high-resistance alloy, as this amount of tellurium increases the resistance of the silicon from three to five times, without making it brittle or introducing any other undesirable physical changes in the cast material.

I prefer to place with the tellurium in the bottom of the crucible a layer of a powdered carbonate which is decomposable at the melting temperature of silicon, about 1430° C. as, for example, calcium carbonate, $CaCO_3$. When the mass is heated the calcium carbonate is decomposed with the formation of calcium oxid and carbon dioxid. The carbon dioxid, when rising from the melting silicon, appears to act as a decarburizer, reacting with the carbon usually associated with the silicon to form carbon monoxide. The calcium oxid, because of its low specific gravity, rises to the surface, where it comes into contact with the silica, which has been formed on the surface of the melted silicon by oxidation, and combines with it either entirely or in part, with the formation of a slag of calcium silicate which floats upon the melted alloy and protects both the silicon and tellurium from oxidation. This method of alloying produces a superior product, free from carbon and oxids.

If desired, the silicon and tellurium can be alloyed by melting them together in an ordinary crucible; the tellurium being placed in the bottom of the crucible and covered with broken pieces of silicon. A simple melting is sufficient to dissolve and distribute the tellurium in the melted silicon, which is then cast into the desired form.

What I claim as new and desire to secure by Letters Patent of the United States, is,—

1. An alloy containing silicon and tellurium.

2. An alloy consisting of silicon alloyed with one to fifteen per cent. of tellurium.

3. The process of producing an alloy of silicon and tellurium which consists in melting silicon and tellurium in the presence of a decomposable carbonate.

4. The process of alloying silicon and tellurium which consists in melting these materials in the presence of a material which will combine with the associated silica to form a protective layer of slag upon the fluid mass.

5. The process which consists in melting silicon and tellurium in the presence of a decarburizing agent.

In witness whereof, I have hereunto set my hand this 23rd day of October, 1908.

JOHN T. H. DEMPSTER.

Witnesses:
    BENJAMIN B. HULL,
    HELEN ORFORD.